(12) United States Patent
Goeddemeier et al.

(10) Patent No.: US 7,444,617 B2
(45) Date of Patent: Oct. 28, 2008

(54) PROGRAMMING TOOL AND PROGRAMMING METHOD

(75) Inventors: Ulrich Goeddemeier, Karlsruhe (DE);
Bernhard Jany, Wendelstein (DE);
Heinrich Kulzer, Nuremberg (DE);
Manfred Prechtl, Schwarzenfeld (DE);
Georg Rupprecht, Nuremberg (DE);
Dietmar Schulz, Rosstal (DE)

(73) Assignee: Siemens AG, Munich (DE)

( * ) Notice: Subject to any disclaimer, the term of this patent is extended or adjusted under 35 U.S.C. 154(b) by 827 days.

(21) Appl. No.: 10/732,537

(22) Filed: Dec. 11, 2003

(65) Prior Publication Data

US 2004/0261056 A1 Dec. 23, 2004

Related U.S. Application Data

(63) Continuation of application No. PCT/DE02/02133, filed on Jun. 11, 2002.

(30) Foreign Application Priority Data

Jun. 11, 2001 (DE) ................................. 101 28 158

(51) Int. Cl.
*G06F 9/44* (2006.01)
*G06F 9/45* (2006.01)
(52) U.S. Cl. .................... 717/106; 717/114; 717/137
(58) Field of Classification Search ........................ None
See application file for complete search history.

(56) References Cited

U.S. PATENT DOCUMENTS 6,868,538 B1 * 3/2005 Nixon et al. ................. 717/100

2003/0145124 A1 * 7/2003 Guyan et al. ................. 709/318

OTHER PUBLICATIONS

Rahman Jamal, Weiterentwicklung der Grafischen Programmiersprache Labview, Elektrotechnische Zeitschrift—Etz, VDE Verlag GMBH., Feb. 1, 1996, pp. 30-32, vol. 117, No. 4, Berlin, Germany.

Rahman Jamal, Graphical Obeject-Oreinted Programming with Labview, Nuclear Instruments & Methods in Physics Research, Section - A: Accelerators, Spectrometers, Detectors and Associated Equipment, 1994, pp. 438-441, vol. 352, North-Holland Publishing Company, Amsterdam, NL.

(Continued)

*Primary Examiner*—Chuck Kendall
(74) *Attorney, Agent, or Firm*—Sughrue Mion, PLLC

(57) ABSTRACT

In the field of automation technology, processes, which are controlled by stored program controllers (2), are divided into modules, which are also known as function blocks. If possible, these function blocks should be used universally. The interfaces of these modules are different from or independent of the technological parameters of the actual technical function. It is a problem for the user to have access to internal knowledge of the program in order to implement the controller (2) for a specific application. To address this and other problems, a programming tool and programming method for creating programs are disclosed, which will provide the user (1), either additionally or alternatively, with technological insight into a process that is to be controlled and/or regulated. An interface (3) is connected between the user (1) and the stored program controller (2), and a plurality of input masks (5) is offered to the user (1) for inputting technological parameters of the process. Therein a respective input mask (5) is assigned to at least a part of the function blocks.

19 Claims, 2 Drawing Sheets

OTHER PUBLICATIONS

Herbert Pichlik, "Bilder-Code Grafische Programmierumgebung National Instruments Labview 6.I," CT Magazin Fuer Computer Technik, Verlag Heinz Heise GMBH., Jan. 29, 2001, p. 88, No. 3, Hannover, Germany.

Archana Shrotriya, "Using Object Linking and Embedding (OLE) Automation in Labview 4.0," National Instruments, Application Note 081, Jun. 1996.

* cited by examiner

PROGRAMMING TOOL AND PROGRAMMING METHOD

This is a Continuation of International Application PCT/DE02/02133, with an international filing date of Jun. 11, 2002, which was published under PCT Article 21(2) in German, and the disclosure of which is incorporated into this application by reference.

FIELD OF AND BACKGROUND OF THE INVENTION

This invention relates to a programming tool and to a programming method for creating programs, in particular in the field of automation technology.

In the field of automation technology, technical processes and functions are made available in the form of program modules. These program modules are also called function blocks. In order to use these function blocks universally, the function blocks are provided with interfaces that allow for the simplest possible linking and retrieval in the chosen program environment. The input and output parameters required to operate such a function block are sent to an I/O bus so as to supply, observe or alter the parameters, if necessary.

Usually, the parameters that are exchanged in the program environment do not correspond to the process parameters of the process to be controlled and/or regulated or to the process parameters of the technical function. Thus, control and understanding of these parameters require that the engineer or technician responsible for finding a solution to the technical problem must use an approach that is adapted to the function block. In other words, a deeper understanding of the programming of the particular control device is required from the engineer and technician.

OBJECTS OF THE INVENTION

It is one object of the present invention to provide a programming tool and a method for programming and creating programs, in particular in the field of automation technology, that will provide the user, either additionally or alternatively, with technological insight into the process to be controlled and/or regulated. Therein, this insight can be used for programming, parameterization, and/or monitoring of the ongoing process.

SUMMARY OF THE INVENTION

According to one formulation of the invention, this and other objects are achieved by an interface that is provided between a user and a stored program controller and/or a program module that represents the stored program controller. The interface provides the particular user with an input mask for inputting technological parameters. Therein, a suitable input mask is assigned to at least a portion of the function blocks. This input mask represents a technological view or insight of the function block and/or the respective process for the particular user. The technological parameters for the input mask can be input, modified and/or checked.

The interface is preferably designed as a dynamic linking library, i.e., in DLL technology. The interface serves to implement or convert the set of software parameters that is assigned to a function block by creating appropriate binary interfaces in an input mask that is assigned to this function block. In other words, the interface serves to implement a technological view and/or a set of technological parameters. The conversion of the parameter set that is assigned to the function block into binary interfaces makes the programming tool independent of the particular application-specific language application. The inventive solution can be used with any user language that is conventionally used in automation technology. Thus, the interface is upwardly compatible.

In concrete terms, in the particular function blocks, a reference is made to a respective input mask, so that, during retrieval or programming of the respective function block, the input mask is simultaneously retrieved and/or offered.

In an advantageous embodiment, an intermediate logic is assigned to the input mask so as to implement additional functions, such as context menus and/or additional checking tools.

In another advantageous embodiment, the input mask is implemented as an OLE object. With the help of OLE objects, mixed documents can be generated, in which mixed data can be processed with their respective source application programs. Thus, this feature serves to implement the programming tool independently of a concrete application-specific language.

As a result, during programming or during retrieval of a function block that contains a respective reference, the input mask assigned to this function block is activated by the interface and offered to the user as an additional technological view or insight.

According to another formulation of the invention, this and other objects are achieved by a programming method, in particular in the field of automation technology. In this method, a stored program controller and/or a program module that represents the stored program controller is programmed, i.e., instanced, so as to regulate a process stored essentially in the form of function blocks. Therein, the aforementioned input masks are assigned to at least a part or portion of the function blocks. The retrieval of these function blocks results in an interface, which is provided between the particular user and the controller, activating the respective, assigned input mask and offering the input mask to the user of the controller for purposes of parameterization, programming and/or checking.

When the parameters are input by means of the input mask, either a dialogue is established so as to allow real-time sequences to be implemented, or the input parameter values are implemented according to system-specific or program-technical requirements.

BRIEF DESCRIPTION OF THE DRAWINGS

The present invention is explained in greater detail below with reference to exemplary embodiments that are depicted in the drawings. Therein.

DETAILED DESCRIPTION OF THE PREFERRED EMBODIMENTS

Figure 1:
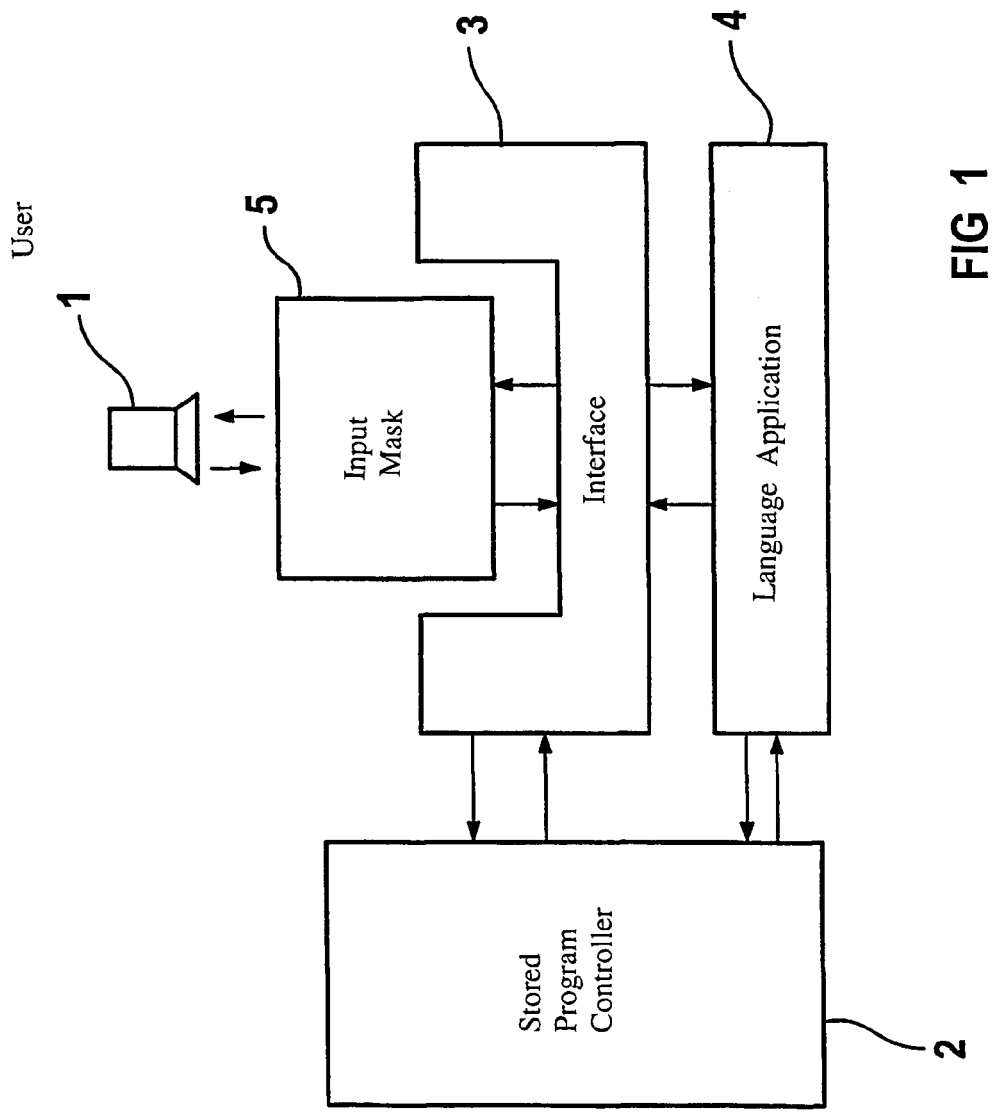
FIG. 1 shows a block diagram depicting the structure of an exemplary embodiment of a programming tool.

In the block diagram shown in FIG. 1, an interface 3 is connected to a user 1 and a stored program controller 2. The interface 3 interacts with an application-specific language application 4 for programming and sequence-controlling of the controller 2. In particular in the phase of creating a program, only a program module, which emulates the functionality of the controller 2, is present instead of the controller 2. However, for a more detailed understanding of this exemplary embodiment and of the invention, it does not matter whether this program module or the controller 2 is present. If communication is necessary, the user 1 does not communicate directly with the interface 3, but, instead, communicates via an input mask 5 that is supplied by the interface 3.

The function or operation of an exemplary embodiment of the programming tool is explained in greater detail below.

The sequence of the control and/or the regulation is stored in a program, which is stored in the form of the application-specific language application 4. Preferably, the application-specific language application 4 includes graphic language applications in the field of automation technology, such as a contact plan (COP) or a function plan (FUP).

In general, regardless of the language application selected, so-called function blocks are retrieved via unambiguous identifiers during execution of the program. These are modules which may stand for certain sequences or for controlling certain technical modules of a technical process, such as controlling a movement regulator or a position regulator. Therein, the retrieval of the function block is relayed to the actual stored program controller 2. At the same time, an identifier of the function block and respective parameters are sent to the interface 3, in combination with an identifier of the corresponding input mask 5. On the basis of this identifier, a technological view of this function block is made available via the input mask 5. In concrete terms, this means that the parameters that, in conjunction with the function parameter, are relayed to the stored program controller 2, are translated into a technological view.

The input mask 5 is a so-called OCX application, i.e., an OLE control element.

Such elements can be created, e.g., with Visual Basic or Visual C++. The parameters displayed in the input mask 5 need not correspond, in absolute value or in number, to the values provided to the stored program controller 2. The display of parameters may be accompanied by a so-called intermediate logic, which is understood to include additional tools that are assigned to individual parameters. These are context menus with which help functions, value ranges or plausibility checks can be offered.

In addition, the interface 3 loads the parameter set supplied via the input mask 5 or establishes a suitable dialogue between the input mask 5 and the interfaces of the function block. If the dialogue is not terminated or the transferred parameters are rejected, e.g., when inadmissible values are input, the interface 3 relays the altered parameter set to the language application 4. Subsequently, there is an acknowledgment via the input mask 5 as to whether or not the particular values are admissible. If the user then approves the values, the user is asked via the dialogue whether the particular values are to be saved. If the answer is yes, then instructions are sent via the interface 3 for saving the values. The input mask 5 then supplies the values separately with a so-called set value command, which is either supplied directly to the controller 2 via the interface 3 or is first entered into the language application 4. In the case of a faulty input, the approval function can be blocked. This prevents acceptance of faulty values.

Figure 2:
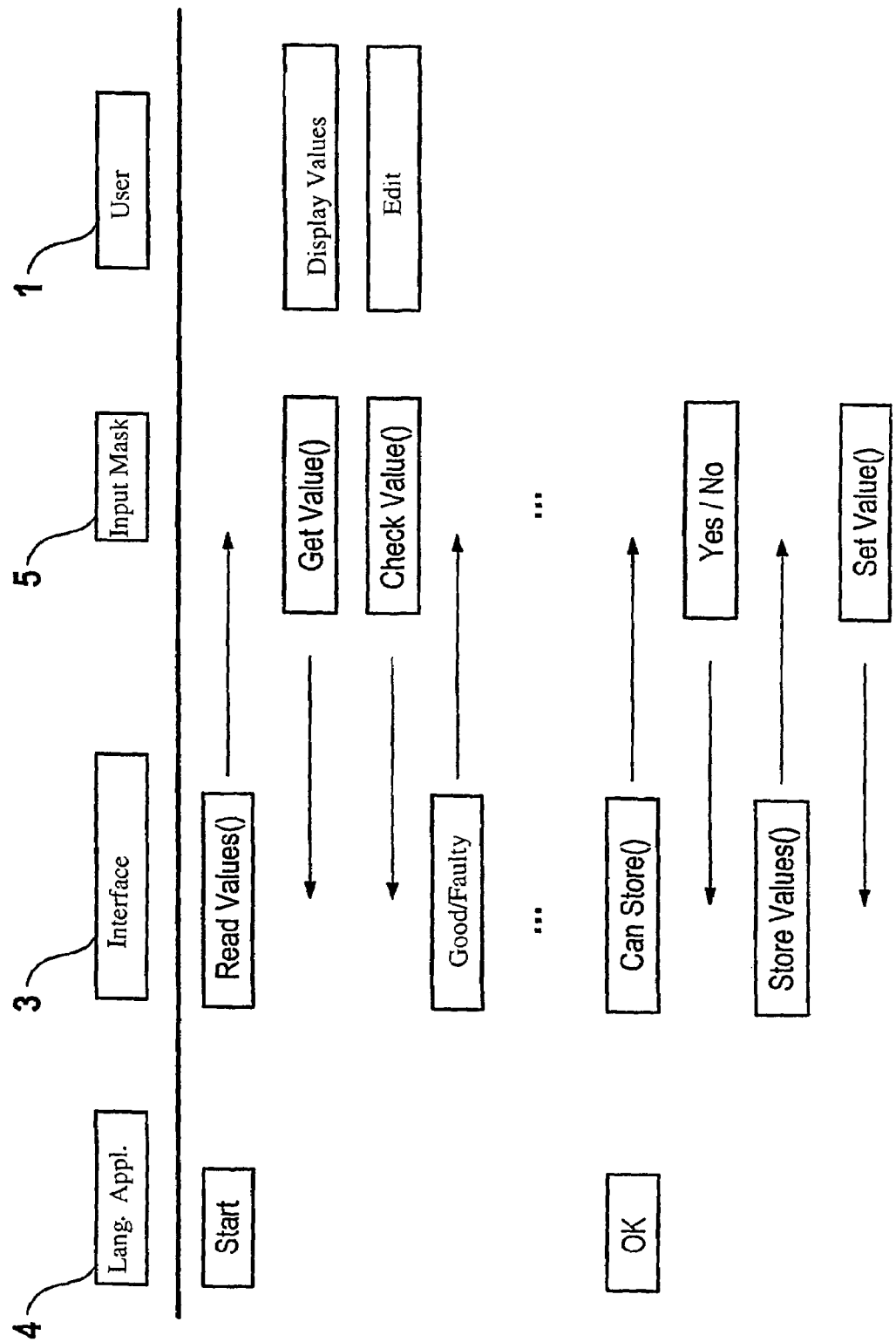
FIG. 2 shows a programming flow chart using the programming tool.

The procedure explained above is diagrammed in the flow chart shown in FIG. 2. Therein, the far left column indicates the sequence taking place within the stored program controller 2 or the language application 4, and the far right column shows the functions offered to the user. In between them are shown the displays or actions of the interface 3, and to the right of that are shown the displays or actions of the input mask 5.

As soon as a function block that contains a reference to an input mask 5 is activated with the start block in the left column, the interface 3 loads the respective input mask 5 and retrieves the corresponding parameter values and displays them via the input mask 5. Using a loop, gradually all the values pertaining to the called-up function block are retrieved and displayed in detail. These values can then be edited by the user 1. Thereafter, in a new loop, the values are transmitted with the "check value" command and relayed to the interface 3. The values are then checked for plausibility, i.e., for admissibility. In particular, the syntax of the input parameters is checked. Subsequently, there is an output from the interface 3 to the input mask 5 indicating whether the values are correct or faulty. If the user 1 then approves the values by operating an enabling button or approval button, the interface 3 inquires whether or not the particular values are to be stored. This is done with a "can store" command. If the answer is yes, then the respective values are stored and a respective message is output to the user 1. These values are then retrieved in a new loop and transferred to the language application 4 or to the controller 2, as explained above.

Thus, a method and a programming tool are described above, which, regardless of the language application 4 used, supply a technological view or insight for at least some of the function blocks. This technological tool or view facilitates the user's task of programming and monitoring stored program controllers 2, in particular in conjunction with complex automation sequences, due to the fact that the familiar technical parameters are displayed and, if necessary, altered.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A programming tool for creating programs embodied on a computer-readable storage medium, comprising:
    at least one of a stored program controller and a program module representing the stored program controller configured to at least one of control and regulate a technical process;
    an interface connected between a user and the at least one of the stored program controller and the program module; and
    a plurality of input masks offered to the user for inputting technological parameters within a parameterization or monitoring activity of the technical process;
    wherein the stored program controller is configured to contain a representation of the process by means of mutually differing function blocks; and
    wherein a respective one of the input masks is configured to be assigned to at least a part of the function blocks.

2. The programming tool according to claim 1, wherein the programming tool is configured to create programs in the field of automation technology.

3. The programming tool according to claim 1,
    wherein the stored program controller comprises an I/O bus;
    wherein the interface is configured to convert a parameter set, which is assigned to a respective one of the function blocks, into binary interfaces for implementing the respective one of the input masks that is assigned to the respective one of the function blocks; and
    wherein the parameter set is configured to be accessed on the I/O bus of the stored program controller.

4. The programming tool according to claim 3, wherein the interface comprises a dynamic linking library application.

5. The programming tool according to claim 1, wherein each of the function blocks is configured to contain a reference to the respective one of the input masks.

6. The programming tool according to claim 1, further comprising an intermediate logic that is assigned to at least a part of the input masks so as to implement additional functions.

7. The programming tool according to claim 6 wherein the additional functions comprise at least one of context menus and checking tools.

8. The programming tool according to claim 1, wherein the input masks comprise object linking and embedding (OLE) tools.

9. The programming tool according to claim 1,
wherein the stored program controller is configured to be programmed via a language application; and
wherein, during at least one of programming and retrieval of a respective one of the function blocks via an assigned one of the input masks, the assigned one of the input masks is configured to be retrieved via the interface by means of a reference contained in the respective one of the function blocks.

10. The programming tool according to claim 9, wherein the language application is application-specific.

11. The programming tool according to claim 10, wherein the language application is selected from the group consisting of alternative web language (AWL), contact plan (COP) and functional plan (FUP).

12. The programming tool according to claim 1, wherein the interface further connects the user and an application specific language module and wherein the application specific module is connected to the program controller for exchanging data.

13. The programming tool according to claim 1, wherein the input technological parameters of the technical process do not correspond to parameters that are exchanged in the program environment of the automation technology, and wherein the program environment comprises the at least one program controller.

14. The programming tool according to claim 1, wherein the plurality of input masks are connected to the interface, which converts the input technological parameters into a binary format.

15. The programming tool according to claim 1, wherein the plurality of input masks are connected to the interface, which converts the input technological parameters into a format independent of application-specific languages.

16. A method of creating a program, comprising:
at least one of programming and parameterizing at least one of a stored program controller and a program module representing the stored program controller so as to at least one of control and regulate a technical process, which is formed by function blocks, by using an application-specific language application;
assigning to a part of the function blocks a reference to an input mask for inputting technological parameters;
upon retrieval of a respective one of the function blocks, activating an interface that is connected between a user and the stored program controller, thereby retrieving the input mask by the interface and displaying the input mask on a display device that is assigned to the stored program controller;
receiving user input via the input mask of the technological parameters within a parameterization or monitoring activity of the technical process; and
converting by the interface the input technological parameters into a format independent of the application-specific language application.

17. The method according to claim 16, wherein the program is created in the field of automation technology.

18. The method according to claim 16,
wherein, in combination with the retrieval of the respective one of the function blocks by the language application, a check is performed to determine whether, in conjunction with the function block, the reference to the input mask is implemented, and, if so, the interface is activated and the input mask is displayed;
wherein the interface reads out technological parameter sets inputted via the input mask and converts the technological parameter sets into a respective string;
wherein the interface retrieves a second interface of the respective one of the function blocks;
wherein the interface at least one of transfers the converted parameter sets to the respective one of the function blocks and establishes a dialogue in object linking and embedding (OLE) technology with syntax checking; and
wherein the interface converts the parameter sets inputted via the dialogue and transfers the parameter sets to the respective one of the function blocks.

19. The method according to claim 16, further comprising converting the input technological parameters into a format independent of application-specific languages, wherein the format is a binary format.

* * * * *